(12) United States Patent
Philippe et al.

(10) Patent No.: US 10,122,486 B2
(45) Date of Patent: Nov. 6, 2018

(54) METHOD FOR CLOCK SYNCHRONIZATION BETWEEN TWO DEVICES CONNECTED BY AN ETHERNET WIRE CONNECTION

(71) Applicant: THALES, Neuilly-sur-Seine (FR)

(72) Inventors: Jean-Yves Philippe, Gennevilliers (FR); Olivier Pierrelee, Gennevilliers (FR)

(73) Assignee: THALES, Courbevoie (FR)

( * ) Notice: Subject to any disclaimer, the term of this patent is extended or adjusted under 35 U.S.C. 154(b) by 737 days.

(21) Appl. No.: 14/522,507

(22) Filed: Oct. 23, 2014

(65) Prior Publication Data
US 2015/0117472 A1     Apr. 30, 2015

(30) Foreign Application Priority Data
Oct. 25, 2013    (FR) ...................... 13 02472

(51) Int. Cl.
*H04J 3/06*        (2006.01)
*H04N 21/8547*     (2011.01)
*H04N 5/376*       (2011.01)

(52) U.S. Cl.
CPC .......... *H04J 3/0667* (2013.01); *H04J 3/0658* (2013.01); *H04N 21/8547* (2013.01); *H04J 3/0635* (2013.01); *H04N 5/3765* (2013.01)

(58) Field of Classification Search
CPC .......... H04N 21/4305; H04N 21/8507; H04N 5/3765; H04N 21/8547; H04W 56/0005; H04W 56/0025; H04J 3/0635; H04J 3/0658; H04J 3/0685
See application file for complete search history.

(56) References Cited

U.S. PATENT DOCUMENTS

| | | | |
|---|---|---|---|
| 2003/0118056 A1* | 6/2003 | Ali | H04N 21/4305 370/503 |
| 2005/0169233 A1* | 8/2005 | Kandala | H04B 1/7183 370/349 |
| 2011/0161701 A1 | 6/2011 | Blixt et al. | |
| 2012/0136956 A1* | 5/2012 | Khoury | H04J 3/0667 709/208 |
| 2012/0275501 A1 | 11/2012 | Rotenstein | |
| 2013/0202291 A1 | 8/2013 | Cavaliere et al. | |

OTHER PUBLICATIONS

"IEEE Standard for a Precision Clock Synchronization Protocol for Networked Measurement and Control Systems," IEEE Instrumentation and Measurement Society, IEEE Std 1588, Jul. 24, 2008.
Pedro Moreira, et al., "White Rabbit: Sub-Nanosecond Timing Distribution over Ethernet", 2009 International Symposium on Precision Clock Synchronization for Measurement, Control and Communication, Oct. 1, 2009, pp. 1-5, XP055129031.

* cited by examiner

*Primary Examiner* — Salvador E Rivas
(74) *Attorney, Agent, or Firm* — Baker & Hostetler LLP

(57) ABSTRACT

A method and system is provided for clock synchronization between two devices comprising a clock. The method comprises the following steps: a step of determining a duration necessary for transmission of a data packet between the two devices, a step of sending by one of the devices a data packet containing a sending time of this packet, and a step of determining the time by the other device by adding the transmission duration to the sending time of the packet.

12 Claims, 5 Drawing Sheets

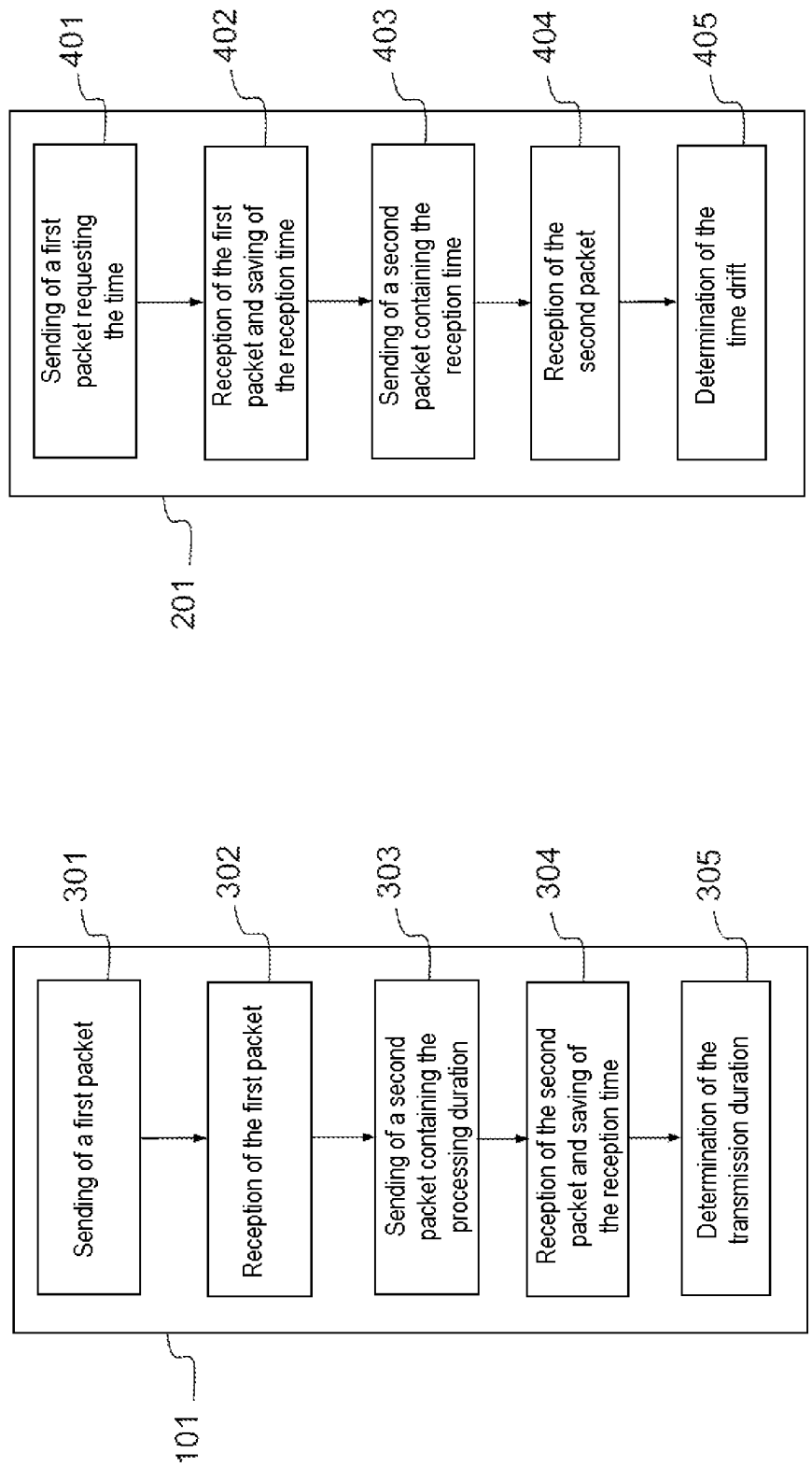

METHOD FOR CLOCK SYNCHRONIZATION BETWEEN TWO DEVICES CONNECTED BY AN ETHERNET WIRE CONNECTION

CROSS-REFERENCE TO RELATED APPLICATION

This application claims priority to foreign French patent application No. FR 1302472, filed on Oct. 25, 2013, the disclosure of which is incorporated by reference in its entirety.

FIELD OF THE INVENTION

The present invention relates to a method and a system for clock synchronization between two devices having clocks, which may be independent. Specifically, in the context of tactical radio communication equipments, it may be necessary to connect complementary units which are several meters apart but between which it is necessary for the clocks to be synchronized with a precision of within 1 µs. This method and system may also be used between two devices close together, while benefiting from the compactness of the interface proposed.

BACKGROUND

Systems and methods which use an interface for connection between the units are known in the prior art. These connections comprise one or more wires dedicated only to the transport of a specific signal allowing the synchronization. However, this solution does not allow a standard connection interface because it requires one signal more, one specific circuit more, one connection means more, and a specific protocol. Furthermore, the information conveyed by this buffered signal does not have the same latency as the Ethernet MAC frame on its interface. An Ethernet MAC frame is intended to mean a data packet transmitted by using the Ethernet local area network protocol. Specifically, the circuit in charge of managing the connection interface sends the signal directly, whereas the MAC frame has undergone several tens of offset clock periods. These systems therefore present a problem of synchronization of the signal intended to synchronize the message.

Systems and methods based on packet exchange are also known in the prior art. This transfer uses a standard connection interface dedicated only to transfer of the data. One example which may be mentioned is the IEEE1588 standard (known by the acronym PTP for "Precision Time Protocol"), which was proposed in 2002 to satisfy the constraints of the real-time methods employed in various technical fields. This standard proposes a very precise solution for synchronization of the clocks (this precision is within one microsecond) of a plurality of networked units. Since this standard is defined for the synchronization of a plurality of units distributed over a local area network, however, it presents a complex method. The complexity of this method is due in particular to the search for the device having the most precise clock in order to make it the master clock of the network. This complexity makes its use problematic in a unit having a low calculation capacity and with few memory resources.

It is therefore an object of the present invention to overcome these problems by providing a system and a synchronization method not having the need for one or more wires dedicated only to the transport of a specific signal making the synchronization possible, and having a low complexity.

SUMMARY OF THE INVENTION

Thus, the invention provides a method for clock synchronization between two devices connected by an Ethernet wire connection and comprising a clock. The method comprises the following steps:
  a step of determining a duration necessary for transmission of a data packet between the two devices,
  a step of sending by one of the devices a data packet containing a sending time of this packet,
  a step of determining the time by the other device by adding the transmission duration to the sending time of the packet, said steps of determining a duration, sending by one of the devices a data packet and determining the time by the other device using Ethernet MAC frame packets.

The clocks of the two devices may be independent if the devices are far apart, or may come from the same source if the two devices are close together.

Advantageously, the method furthermore comprises:
  a step of determining a time drift of a clock of one of the devices with respect to the clock of the other device,
  a step of correcting this time drift of the clock, the said correction being carried out by putting forward the clock of the device whose clock is slow or putting back the clock of the device whose clock is fast.

Advantageously, the step of determining a time drift comprises the following steps:
  a step of sending a first data packet and of saving a sending time of the packet by one of the devices, the said packet being sent to the other device,
  a step of reception of the first packet and of saving a reception time by the other device,
  a step of sending a second packet by the other device, the said second packet containing the said reception time,
  a step of reception of the said second packet by the device,
  a step of determining the drift on the basis of the sending time, the reception time and the transmission duration.

Advantageously, the step of determining the drift is adapted for the use of the following equation:

$$\text{drift} = t_{recep} - t_{send} - TL$$

in which $t_{send}$ represents the sending time of the first packet, $t_{recep}$ represents the reception time of the second packet, TL represents the transmission duration, and drift represents the drift of the clock.

Advantageously, the step of determining a transmission duration comprises the following steps:
  a step of sending a first data packet, requesting the other device to send a second data packet in return, and of saving a sending time, by one of the devices,
  a step of reception of the said first packet by the other device,
  a step of sending a second packet by the other device, which may contain an indication of a duration of a processing operation separating the reception of the first packet and the sending of the second packet,
  a step of reception of the second packet and of saving a reception time of the second packet by the device,
  a step of determining the transmission duration on the basis of the sending time, the reception time and the processing duration.

Advantageously, the step of determining the transmission duration is adapted for the use of the following equation:

$$TL=(t_{recep}-t_{send}-TLDPG)/2$$

in which $t_{send}$ represents the sending time of the first packet, $t_{recep}$ represents the reception time of the second packet, TLDPG represents the processing duration, and TL represents the transmission duration.

The invention also relates to a system which comprises two devices connected by an Ethernet wire connection. The devices comprise:
synchronization means configured for carrying out the clock synchronization method as described above, and a clock.

Advantageously, the data packets exchanged between the said devices are generated by an MAC layer.

Advantageously, the clocks of the devices are based on incrementing a counter at the rate of a clock used by the said Ethernet connection.

Advantageously, the synchronization means are a FPGA, an ASIC or an external component.

The advantages of this invention are as follows:

The invention uses standard Ethernet MAC frame packets, according to one standard of the IEEE 802.3 norm. The use of these standard MAC packets makes it possible to provide more economical circuits.

The protocol is adjusted to the synchronization requirement of a point-to-point connection, and does not have the complexity of the synchronization methods known in the prior art.

The synchronization is the most refined possible since it directly uses the clock used by the MAC layer and the Ethernet connection.

There are no modifications made to the data connection layer.

Lastly, this method does not require continuous transmission on the Ethernet connection, which makes it possible to avoid superfluous use of the connection and therefore superfluous consumption.

Furthermore, the method is advantageous even between two devices which are close together (between 2 boards inside a unit), which in this configuration case may have the same clock. This is because the constraints of space and cost favour interfaces of the rapid serial type. In this case, there is no longer the problem of the clocks drifting (except if the clocks do not have the same controller), once the devices are synchronized.

BRIEF DESCRIPTION OF THE DRAWINGS

The invention will be understood more clearly, and other advantages will become apparent, on reading the detailed description provided by way of nonlimiting example and with the aid of the figures, in which:

FIG. 3.b presents the flowchart of the step of determining a duration necessary for transmission of a data packet between the two devices.

FIG. 4.b presents the flowchart of the step of determining a time drift.

DETAILED DESCRIPTION

Figure 1:
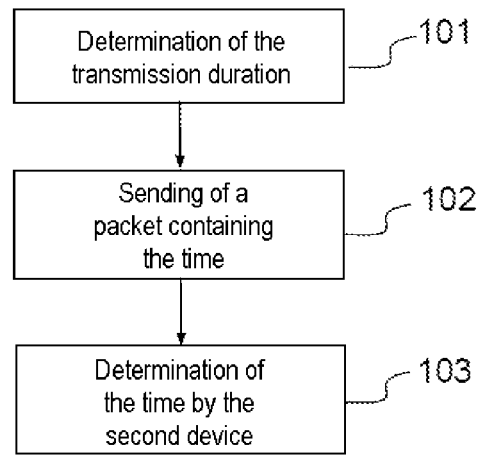
FIG. 1 presents the time synchronization method.

FIG. 1 describes the method for time synchronization between two devices. This method comprises the following steps:

A step 101 of determining a duration necessary for transmission of a data packet between the first device and the second device.

A step 102 of sending by one of the two devices a data packet containing a sending time of this packet.

A step 103 of determining the time by the other device by adding the transmission duration to the sending time of the packet.

This method therefore makes it possible to synchronize the time of the second device with the time of the first device.

Figure 2:
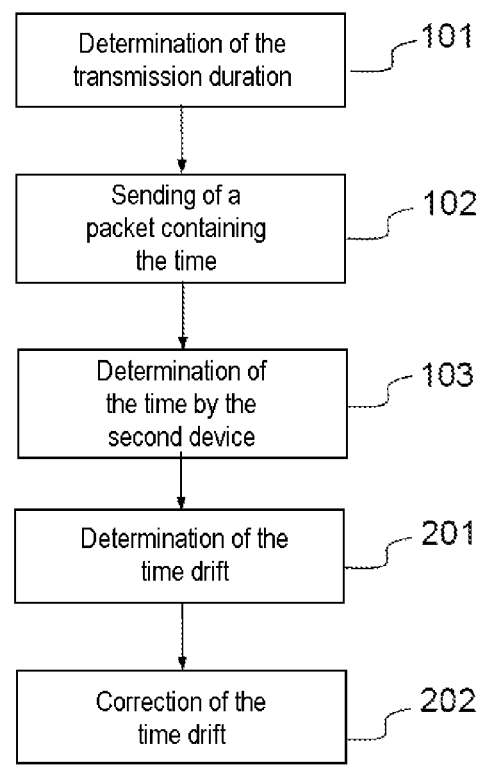
FIG. 2 presents an improvement of the time synchronization method for the case of monitoring the drift.

In an embodiment presented by FIG. 2, the method comprises two steps which make it possible to correct a time drift of the internal clock of one of the units with respect to the internal clock of the other unit. These two steps are as follows:

A step 201 of determining a time drift of a clock of one of the devices with respect to the clock of the other device.

A step 202 of correcting this time drift by one or other of the devices. It is possible to correct the clock of the device which is fast by putting its clock back, or to correct the clock of the device which is slow by putting its clock forward.

Figure 3B:
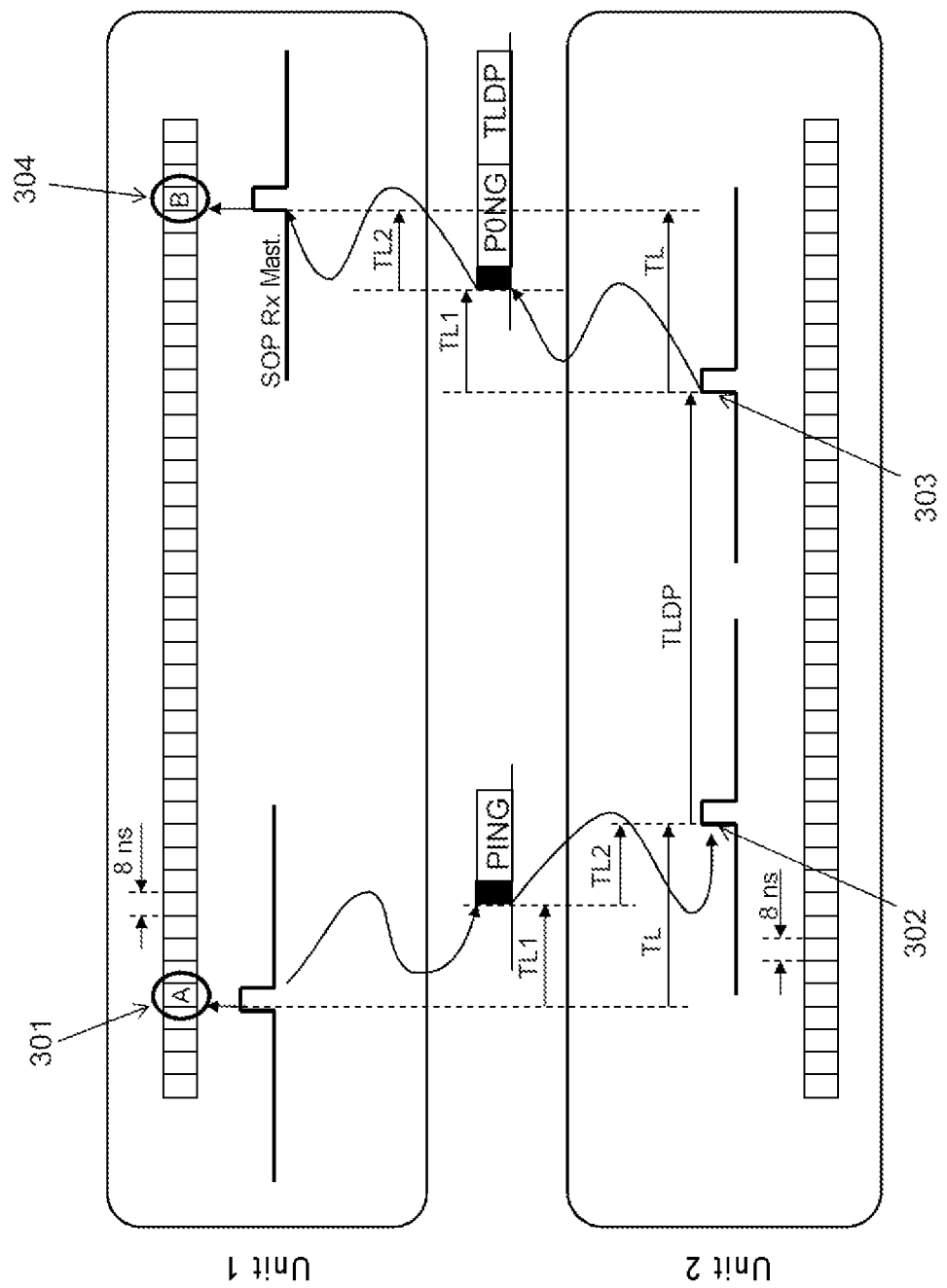
FIG. 3.a presents the description of one embodiment of the step of determining a duration necessary for transmission of a data packet between the two devices.

FIG. 3.a presents the description of one embodiment of the step 101 of determining a duration necessary for transmission of a data packet between the two devices. By way of illustration and without limitation, it is the first device which will initiate the method, although it is possible for this initiation to be carried out by the second device. The determination of this transmission duration is based on the following steps:

A step 301 of sending a first data packet by the first device. In this first data packet, it is indicated that the second device should send a data packet indicating the duration which the second device has taken to process the data packet. The first device furthermore saves the sending time ($t_{send}$) of the data packet.

A step 302 of reception of the first data packet. The time which has been necessary for the transmission of the data packet comprises two parts TL1 and TL2. The total transmission time is denoted as TL.

TL1 corresponds to the time taken for the circuits in charge of the Ethernet management (MAC layer part or MAC layer plus PHY layer) to physically transmit the frame over the interface from the instant when the emission instruction was given. This time (in clock periods at 125 MHz for the Gigabit Ethernet) corresponds to the time for these circuits (in synchronous technology) to carry out the digital processing operations necessary to construct the frame and send it over the interface. This time is always the same for one and the same type of circuit.

At reception, the time is different because the digital processing operations are not the same (the reception problems are not the same as the transmission problems).

A step 303 of sending a second packet by the first device. This included packet may incorporate an indication of the duration (TLDPG) of processing the packet by the second device. If the indication of the duration (TLDPG) of processing the packet by the second device is not contained in the second packet, it may be known by the first device because it is loaded in its memory before the method is carried out. In fact, because this time is fixed for a given device, it is sufficient for this time to be known by the opposite device in order to apply the formula. Transmission of this time during the development phase, or in the event of modifications or changes of a device, makes it possible to avoid also having to correct the other opposite device if it uses a fixed time.

A step 304 of reception of the second packet by the first device and of saving the reception time ($t_{recep}$) by this first device. It is assumed that the transmission duration for a packet between the first and the second device is the same as the transmission duration between the second device and the first device. This is due to the symmetry of the design.

A step 305 of determining the transmission duration on the basis of the sending time, the reception time and the processing duration. The determination is carried out by using the following formula:

$$TL=(t_{recep}-t_{send}-TLDPG)/2$$

FIG. 3.b presents the flowchart of the step of determining a duration necessary for transmission of a data packet between the two devices.

Figure 4B:
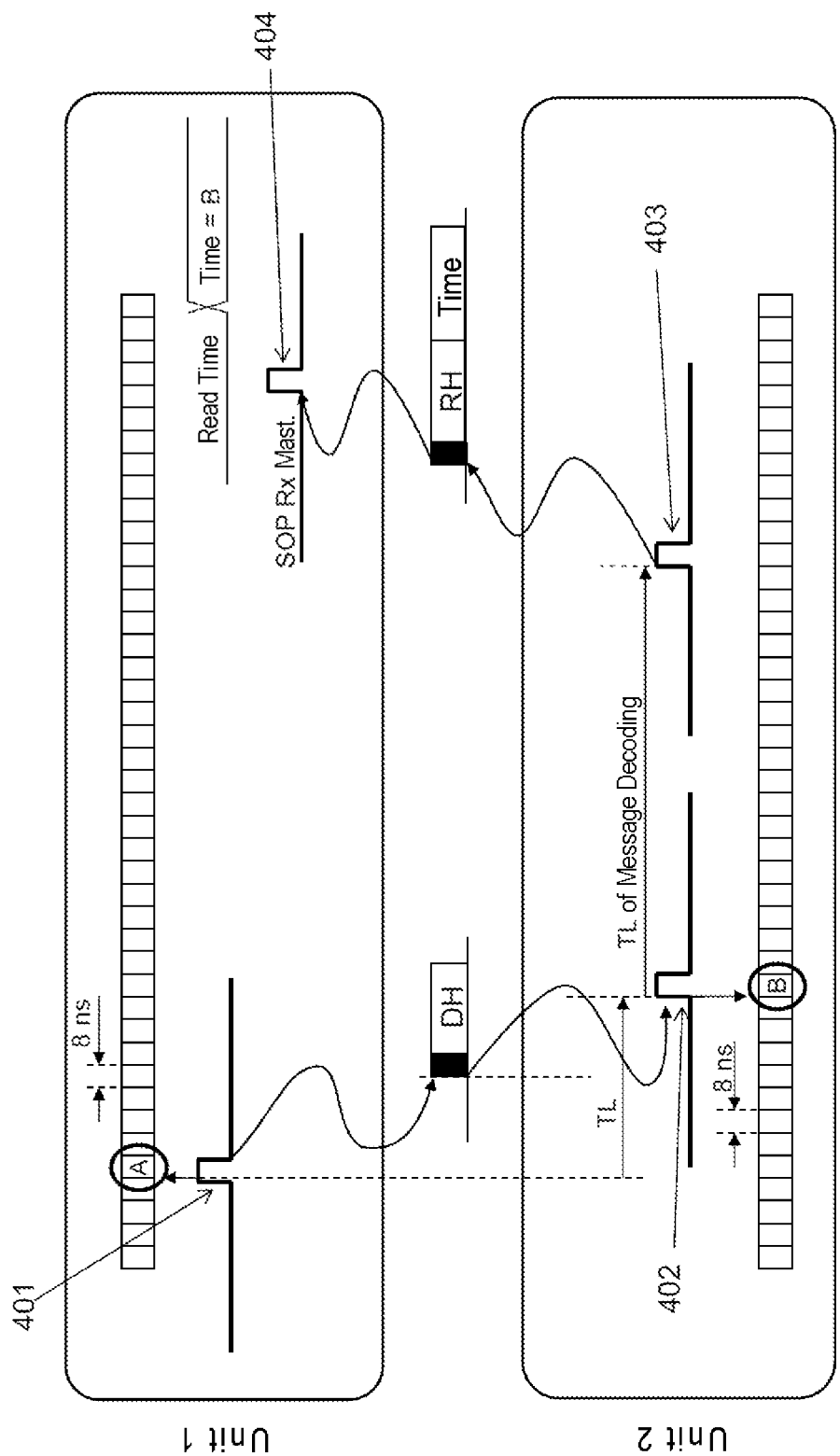
FIG. 4.a presents the description of one embodiment of the step of determining a time drift.

FIG. 4.a describes one embodiment of the step 201 of determining a time drift. By way of illustration and without limitation, it is the first device which will initiate the method, although it is possible for this initiation to be carried out by the second device. The determination of this time drift is based on the following steps:

A step 401 of sending a first packet, requesting the time, by the first device to the second device. The first device furthermore saves the sending time ($t_{send}$) of the data packet.

A step 402 of reception of the first data packet and of saving the reception time of this packet ($t_{recep}$). These two operations are carried out by the second device.

A step 403 of sending a second packet, containing the time of reception of the first packet by the second device, by the second device.

A step 404 of reception of the second packet by the first device.

A step 405 of determining the drift on the basis of the sending time, the reception time and the transmission duration (TL). The determination is carried out by using the following formula:

$$\text{drift}=t_{recep}-t_{send}-TL$$

FIG. 4.b presents the flowchart of the step of determining a time drift at transmission of a data packet between the two devices.

Since the determination of a time drift requires knowledge of the transmission duration TL, it is therefore necessary to carry out the step of determining a transmission duration and the step of updating the two devices before carrying out the step of determining a time drift.

Figure 5:
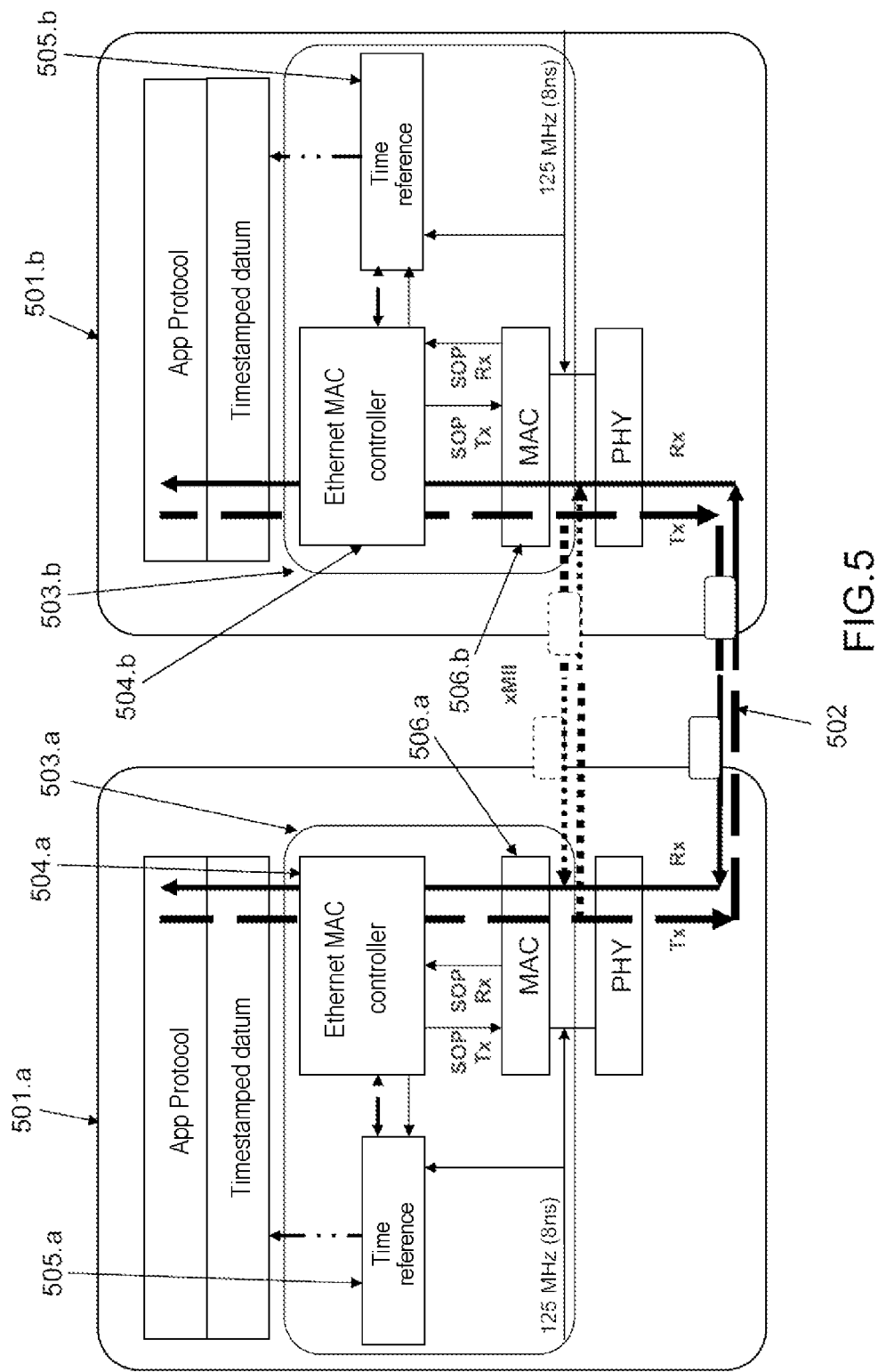
FIG. 5 presents an embodiment of a system according to the invention.

The method of the invention may be carried out in a system as represented in FIG. 5. This system comprises two devices (501.a and 501.b), which are connected by a connection 502. This connection may be an Ethernet connection (it is preferable to use a connection of the Gigabit Ethernet type in order to provide a fast rate and a high precision), but it is also possible to use other types of connection known to the person skilled in the art.

Thus, in order to be able to produce an Ethernet connection of up to 100 m on 4 pairs of wires (for example a Gigabit Internet connection using 4 bidirectional differential pairs with information encoded over 2 bits), it is necessary to use the interface circuits of the PHY layer (this is the nominal configuration). For devices which are close together (board to board), however, it is possible not to use these drivers or circuits implementing functions of the PHY layer, and to carry out a connection directly between the MAC components. This makes it possible to save space, limit the cost of the components and limit the consumption.

An Ethernet connection is conventionally produced by two separate circuits: one circuit comprising the functionality of the MAC part and one circuit comprising the functionality of the PHY part. The functionality of the PHY part has the role of ensuring the integrity of the information sent over several tens of meters by adapting the signal to the transmission channel. The transmission channel consists, for example, of the cable connecting the two boards. Thus, the PHY component is different if the medium is a copper cable or if the medium is an optical fibre.

When the distance between the two devices to be connected is only a few centimeters, however, the presence of a PHY circuit is no longer justified. It is entirely possible in this case, by means of some specificities of the component fulfilling the MAC functionality, to make a so-called "MAC to MAC" connection without an intermediate PHY circuit. Depending on the constraints of the system, this makes it possible to save on space occupancy and production cost. In this case, the interface between the two components fulfilling the MAC functionality is a connection known by the acronym SGMII for Serial Gigabit Media Independent Interface in order to limit the number of signals and make the differences between the media transparent for the MAC sublayer of the data connection layer. It may be noted that this specificity is intrinsic to the Ethernet interface. It consists in providing a "slave" MAC and a "master" MAC.

These two devices each comprise a programmable logic circuit (503.a and 503.b) of the FPGA or ASIC type. FPGA is the acronym for "field-programmable gate array". ASIC is an acronym meaning Application-Specific Integrated Circuit. These FPGAs or ASICs have the purpose of controlling the Ethernet connection.

Thus, according to what is presented in FIG. 5, the zone 503.a or 503.b comprises three separate functionalities:

506.a and 506.b fulfil the MAC function defined by the Ethernet standard for the media access. There are a number of suppliers who provide this functionality in the form of a logic zone or IP logic, for Intellectual Property.

Zones 504.a and 504.b are tasked with carrying out the management and control of the MAC layer.

Zones 505.a and 505.b constitute the time reference. This reference may be provided by a counter which is incremented at the rate of the clock used by the Ethernet connection (this clock is at a frequency of 125 MHz in the context of using Gigabit Ethernet).

These three zones are implemented in a FPGA or in an ASIC.

The processing operations associated with the PHY function are not integrated into the FPGA or the ASIC.

In one embodiment, it is also possible to use external components tasked with fulfilling the MAC function.

In the case of this device, the step 101 of determining a duration necessary for transmission of a data packet between the two devices is carried out in the following way:

The step 301 of sending a first data packet by the first device is carried out by use of the zone 504.a which controls the MAC layer and the Ethernet connection, and which makes it possible to generate a data packet sending signal (Start Of Packet or the acronym SOP). The sending of this signal makes it possible to indicate to the MAC layer that it should send an Ethernet frame. Simultaneously, the sending time is saved by using the time reference integrated into the device.

The step 302 of reception of the first data packet is carried out by means of one of the zones 504.a or 504.b in charge of the control of the MAC layer and the Ethernet connection of the second device. This logic or logic zone is then based on the signals indicating the arrival of the message (also known by the acronym SOP Rx for Start of Packet Rx). In another embodiment, the logic zones or MAC logics do not necessarily provide the signal SOP Rx. The controller of the MAC function (zone 504.b) therefore needs to generate it on the basis of the other signals of the interface of the MAC.

The step 303 of sending a second packet by the second device is carried out by the zone 504.b. On reception of a signal indicating the arrival of the message, this logic zone initiates a synchronous message sending procedure. This message is sent at the end of a duration (TLDPG). The message contains the processing duration (TLDPG). This duration will depend on the way in which the method is implemented and on the performance of the device on which this method is implemented. This second packet is, however, sent only if the received first packet requests that a message be sent in return.

The step 304 of reception of the second packet by the first device is carried out by means of the logic zone 504.a. This zone makes it possible to determine the reception time ($t_{recep}$) on the basis of the time reference integrated into the device. The information about the processing duration (TLDPG) contained in the message is also saved.

Lastly, the step 305 of determining the transmission duration is carried out by the logic zone 504.a.

In the case of the device presented in FIG. 5, the step 201 of determining a time drift is carried out in the following way:

The step 401 of sending a first packet requesting the time to the second device and of saving a sending time ($t_{send}$) is carried out by use of the logic zone 504.a, which makes it possible to generate a data packet sending signal (Start Of Packet or the acronym SOP). The sending of this signal makes it possible to indicate to the Ethernet MAC layer that it should send an Ethernet frame. Simultaneously, the sending time is saved by using the time reference integrated into the device.

The step 402 of reception of the first packet and of saving a first reception time ($t_{recep}$) is carried out by the logic zone 504.b. This logic zone is then based on the signals indicating the arrival of the message (also known by the acronym SOP Rx for Start of Packet Rx). This zone furthermore makes it possible to determine the reception time ($t_{recep}$) on the basis of the time reference integrated into the device.

The step 403 of sending a second packet containing the time of reception of the first packet by the second device is carried out by the logic zone 504.b.

The step 404 of reception of the second packet is carried out by the logic zone 504.a.

Lastly, the step 405 of determining the drift is carried out by the logic zone 504.a.

The invention claimed is:

1. A method for clock synchronization between two devices connected by an Ethernet wire connection and comprising a clock, comprising the following steps:
  a step of determining a duration TL necessary for transmission of a data packet between the two devices via the Ethernet wire connection, comprising:
    a step of sending a first data packet by one of the devices, requesting the other device to send a second data packet in return, and of saving a sending time $t_{send}$, by one of the devices,
    a step of reception of said first data packet by the other device,
    a step of sending a second data packet by the other device, which contains an indication of a duration of a processing operation TLDPG separating the reception of the first data packet and the sending of the second data packet,
    a step of reception of the second data packet and of saving a reception time $t_{recep}$ of the second data packet by the device,
    a step of determining the transmission duration on a basis of the sending time, the reception time and the processing duration using the following equation:

$$TL=(t_{recep}-t_{send}-TLDPG)/2$$

a step of sending by one of the devices a third data packet containing a sending time of this third data packet, and
  a step of determining a reception time of the third data packet, by the other device by adding the transmission duration to the sending time of the third data packet, and synchronizing the clock of the other device over the reception time of the third data packet,
  said steps of determining a duration, sending by one of the devices a data packet and determining the time by the other device are implemented utilizing a circuit that transmits and receives Ethernet MAC frame packets.

2. A system comprising two devices connected by an Ethernet wire connection, said devices comprising:
  a programmable logic circuit configured for carrying out the clock synchronization method according to claim 1, and
  a clock.

3. The system according to claim 2, wherein said data packets exchanged between the said devices are generated by an MAC layer.

4. The system according to claim 2, wherein said clocks of said devices are based on incrementing a counter at a rate of a clock used by said Ethernet connection.

5. The system according to claim 2, wherein the programmable logic circuit comprises at least one of the following: a Field-Programmable Gate Array (FPGA) or an Application-Specific Integrated Circuit (ASIC).

6. The clock synchronization method according to claim 1, further comprising implementing in each of the devices a programmable logic circuit configured to carry out the clock synchronization.

7. The clock synchronization method according to claim 6, wherein the programmable logic circuit comprises at least one of the following: a Field-Programmable Gate Array (FPGA) or an Application-Specific Integrated Circuit (ASIC).

8. The clock synchronization method according to claim 1, further comprising incrementing a counter of the clocks of the devices at a rate of a clock used by said Ethernet connection.

9. A method for clock synchronization between two devices connected by an Ethernet wire connection and comprising a clock, comprising the following steps:
- a step of determining a duration TL necessary for transmission of a data packet between the two devices via the Ethernet wire connection, comprising:
  - a step of sending a first data packet by one of the devices, requesting the other device to send a second data packet in return, and of saving a sending time $t_{send}$, by one of the devices,
  - a step of reception of said first data packet by the other device,
  - a step of sending a second data packet by the other device, which contains an indication of a duration of a processing operation TLDPG separating the reception of the first data packet and the sending of the second data packet,
  - a step of reception of the second data packet and of saving a reception time $t_{recep}$ of the second data packet by the device,
  - a step of determining the transmission duration on a basis of the sending time, the reception time and the processing duration using the following equation:

$$TL=(t_{recep}-t_{send}-TLDPG)/2$$

- a step of sending by one of the devices a third data packet containing a sending time of this third data packet,
- a step of determining a reception time of the third data packet, by the other device by adding the transmission duration to the sending time of the third data packet, and
- synchronizing the clock of the other device over the reception time of the third data packet,
- wherein said steps of determining a duration, sending by one of the devices a data packet, and determining the time by the other device are implemented using Ethernet MAC frame packets.

10. The clock synchronization method according to claim 9, further comprising implementing in each of the devices a programmable logic circuit configured for carrying out the clock synchronization.

11. The clock synchronization method according to claim 10, wherein the programmable logic circuit comprises at least one of the following: a Field-Programmable Gate Array (FPGA) or an Application-Specific Integrated Circuit (ASIC).

12. The clock synchronization method according to claim 9, further comprising incrementing a counter of the clocks of the devices at a rate of a clock used by said Ethernet connection.

* * * * *